United States Patent [19]

Beall et al.

[11] 4,314,909

[45] Feb. 9, 1982

[54] HIGHLY REFRACTORY GLASS-CERAMICS SUITABLE FOR INCORPORATING RADIOACTIVE WASTES

[75] Inventors: George H. Beall, Big Flats; Hermann L. Rittler, Corning, both of N.Y.

[73] Assignee: Corning Glass Works, Corning, N.Y.

[21] Appl. No.: 164,363

[22] Filed: Jun. 30, 1980

[51] Int. Cl.[3] .......................... C03C 3/04; C03C 3/22; H01B 1/08

[52] U.S. Cl. ........................................ 252/629; 65/33; 501/5; 501/6; 501/10; 501/63; 501/64; 501/73

[58] Field of Search ................ 252/301.1 W, 301.1 R, 252/628; 106/39.6, 52; 65/33

[56] References Cited

U.S. PATENT DOCUMENTS

| | | | |
|---|---|---|---|
| 3,161,601 | 12/1964 | Barton | 252/301.1 W |
| 3,236,662 | 2/1966 | MacDowell | 106/39.6 |
| 3,723,140 | 3/1973 | Beall et al. | 106/39.6 |
| 3,726,695 | 4/1973 | Beall et al. | 106/39.6 |

OTHER PUBLICATIONS

McCarthy, Gregory J., "Crystalline and Coated High-Level Forms", NUREG/CP-0005, pp. 623-650 of PROCEEDINGS of the Conference on *High-Level Radioactive Solid Waste Forms* Dec. 19-21, 1978, Denver, Colo. pub. Apr. 1979.

*Primary Examiner*—Helen M. McCarthy
*Attorney, Agent, or Firm*—Clinton S. Janes, Jr.

[57] ABSTRACT

This invention is concerned with the production of glass-ceramics especially suitable for incorporating radioactive wastes. The inventive glass-ceramics contain at least two crystal phases selected from the group of pollucite, mullite, monazite, and, optionally, tetragonal or cubic zirconia as the predominant crystal phases and consist essentially, expressed in weight percent on the oxide basis, of 5-40% $Cs_2O$, 15-50% $Al_2O_3$, 0-30% $La_2O_3+CeO_2$, 0-20% $P_2O_5$, 0-30% $ZrO_2$, 12-65% $La_2O_3+CeO_2+P_2O_5$, and 15-50% $SiO_2$.

3 Claims, No Drawings

HIGHLY REFRACTORY GLASS-CERAMICS SUITABLE FOR INCORPORATING RADIOACTIVE WASTES

BACKGROUND OF THE INVENTION

In industrial and military nuclear operations, radioactive wastes ("radwastes") are formed which must be treated in a suitable manner to permit safe storage. Thus, most conventional processes whereby uranium, plutonium, and/or other radionuclides are recovered via the reprocessing of nuclear fuel rods yield radwastes as necessary, but unwanted, by-products. Because of the highly radioactive nature of those materials, they must be prevented from reaching the biosphere. The composition of any particular radwaste will, self-evidently, be dependent upon the nuclear technology involved. An analysis of a typical radwaste resulting from the reprocessing of nuclear fuel rods is provided by A. E. Ringwood et al. in "Immobilization of High Level Nuclear Reactor Wastes in SYNROC", *Nature*, 278, Mar. 15, 1979, pages 219-223:

|  | Mol % |
|---|---|
| Fission Products | |
| Rare Earth | 26.4 |
| Zr | 13.2 |
| Mo | 12.2 |
| Ru | 7.6 |
| Cs | 7.0 |
| Pd | 4.1 |
| Sr | 3.5 |
| Ba | 3.5 |
| Rb | 1.3 |
| Actinides | |
| U + Th | 1.4 |
| Am + Cm + Pu + Np | 0.2 |
| Processing Contaminants | |
| Fe | 6.4 |
| (PO$_4$) | 3.2 |
| Na | 1.0 |
| Others | |
| Tc + Rh + Te + I + Ni + Cr | 9.0 |

As is apparent, radwaste is a complex and many-component mixture.

Various schemes have been proposed to store radioactive wastes so as to isolate them from the environment. Inasmuch as the radioactivity of the subject materials may, in some instances, persist for literally thousands of years, the means of isolation must withstand attack essentially indefinitely from not only the radioactive material, but also from the chemical and physical stresses of the natural environment. Most of those proposals have contemplated first reducing the volume of the effluents, thereby concentrating the radioactive substances, and thereafter incorporating the concentrates into a surrounding matrix.

The earliest procedures simply solidified the wastes in alkali metal silicates, cements, concrete, or bitumen. Modifications of those processes have involved incorporating the radioactive concentrates into polymerizable resins and subsequently polymerizing the resins to solid blocks. Unfortunately, all of those matrices have low thermal stability and relatively low radiation resistance over extended periods of time. Moreover, those matrices exhibit unacceptable mechanical stability and leaching resistance.

Another approach has comprehended mixing the waste concentrates with various clays, diatomaceous earth, ion exchangers, peat, vermiculite, asbestos, and/or other ceramic materials and thereafter firing the mixture with or without concurrent pressing to form a solid body. However, the general quality of the solidified bodies containing high concentrations of radioactive substances has not been sufficient for final storage purposes and the physical stability and chemical durability of the products have not been deemed satisfactory for long term storage.

Probably the most extensive area of research has involved the use of glass as a matrix material. Thus, glass is capable of dissolving a wide variety of substances, including the radioactive isotopes of concern in the waste concentrates. Hence, the concentrated wastes are mixed with various glass formers, the mixture is melted so as to distribute the radioactive substances throughout the resulting glass melt, and the melt is then cooled to a glass body. Concern has been expressed, however, regarding the fundamental lack of thermodynamic stability inherent in glass. It is well-recognized that, under hydrothermal conditions, glasses are subject to leaching, dissolution, and uncontrolled crystallization which often produces surface spalling. Furthermore, decomposition of the glass structure may occur in the course of prolonged storage due to the continued emission of radiation and heat energy by the incorporated radioactive substances, with the result that the resistance of the glass structure deteriorates with time such that its ability to effectively retain radioactive materials is diminished.

Most recently, hot pressed ceramic bodies of exotic compositions have been hailed as more stable host media with superior thermal stability and corrosion resistance. Examples of such are discussed by Ringwood et al., supra. Unfortunately, those materials have proven difficult to mass produce commercially without undesirable porosity and inhomogeneity.

SUMMARY OF THE INVENTION

The present invention is founded in the use of a glass-ceramic having a composition of defined limits as the matrix material for the incorporation of radioactive wastes. Thus, the inventive glass-ceramics reside in the base system $SiO_2$—$Al_2O_3$—$Cs_2O$—$(La,Ce)_2O_3$—$P_2O_5$—$ZrO_2$. The desired finegrained glass-ceramics produced from the compositions contain two or more of the following crystal phases: monazite (La,Ce,Th)PO$_4$, mullite (3Al$_2$O$_3$·2SiO$_2$), cubic or tetragonal zirconia solid solution (ZrO$_2$), and pollucite solid solution. X-ray diffraction analyses of the pollucite crystals formed in the inventive products have indicated the occurrence of solid solution, i.e., the diffraction patterns have frequently closely approximated, but not identically matched, that of classic pollucite (Cs$_2$O·Al$_2$O$_3$·4SiO$_2$).

It has been conjectured that solid solution has occurred in the crystals in a manner which is similar to the well-recognized phenomenon taking place in such crystals as betaspodumene (classic formula Li$_2$O·Al$_2$O$_3$·4SiO$_2$). Solid solutions have been described in those crystals wherein the molar content of SiO$_2$ has varied over the range of two to eight and minor amounts of other alkali metal ions have been substituted for part of the lithium and a minor proportion of the Al$_2$O$_3$ has been replaced with B$_2$O$_3$. Consequently, as utilized herein, the term "pollucite" must be interpreted to include solid solution.

Each of those above-described phases can play a beneficial role in the storage of radioactive wastes. For example, pollucite has been recognized as a stable sink for the radioactive isotope $Cs^{137}$. Monazite has been cited as a sink for actinide and rare earth elements such as uranium, plutonium, and americium. Moreover, inasmuch as nuclear wastes can contain actinide elements and rare earths, monazite may be formed by merely including $P_2O_5$ in the glass batch. This mineral is among the most durable found in nature and is common as an undissolved residuum in the weathering and erosion of igneous rocks. Mullite is stable, refractory, and manifests excellent chemical durability. Besides its well-known chemical durability, zirconia can dissolve strontium oxide (SrO) up to 7.5% by weight in its tetragonal form and over 10% in the cubic form. This capability is quite significant because the isotope $Sr^{90}$ is a key ingredient in a number of radioactive wastes. Zirconia can also incorporate actinides into its crystal lattice. It is possible to stabilize zirconia in the cubic state via the inclusion of small amounts (>5%) of CaO into the glass-ceramic batch.

Glass-ceramics suitable for the incorporation of radioactive wastes are prepared from precursor glasses which consist essentially, expressed in weight percent on the oxide basis, of 5-40% $Cs_2O$, 15-50% $Al_2O_3$, 0-30% $La_2O_3+CeO_2$, 0-20% $P_2O_5$, 0-30% $ZrO_2$, 12-65% $La_2O_3+CeO_2+P_2O_5+ZrO_2$, and 15-50% $SiO_2$. Monazite with or without zirconia crystals, and preferably both phases, ought to be present in the glass-ceramic to provide for the incorporation of actinides and rare earths. Accordingly, the preferred compositions will contain at least 5% $La_2O_3+CeO_2$ and sufficient $P_2O_5$ up to 20% to react therewith to form monazite. The precursor glasses are crystallized in situ to glass-ceramic bodies by heat treating at temperatures between about 1250°-1550° C. Customarily, the parent glass bodies are crystallized via a two-step heat treatment to insure a uniformly fine-grained, final product. This two-step treatment involves nucleation at about 900°-1100° C. followed by crystallization at 1250°-1550° C.

In summary, the process for forming the inventive products comprises three general steps:

(a) a batch of the proper composition is melted;
(b) the melt is simultaneously cooled at least below the transformation range thereof and a glass body of a desired configuration shaped therefrom; and
(c) the glass body is exposed to a temperature between about 1250°-1550° C. for a period of time sufficient to achieve the desired crystallization in situ.

In general, a heat treating period of at least about one hour has been found necessary to secure high crystallinity. Much longer treatment periods, e.g., 24 hours or even longer, may be utilized with no harmful effect. Nevertheless, such longer times are not commercially attractive since the improvement in crystallinity resulting therefrom is not significant.

As noted above, the preferred heat treatment practice contemplates a two-step schedule wherein the glass body is initially heated to a temperature between about 900°-1100° C. and held within that range for a period of time sufficient to obtain adequate nucleation and incipient crystal development, and the nucleated body is thereafter heated to a temperature between about 1250°-1550° C. and maintained within that range for a period of time sufficient to promote substantial crystal growth. Customarily, a nucleation period of about 1-6 hours followed by a crystal growth period of about 1-8 hours has been found quite effective.

Several embodiments of the basic method are possible:

First, radwaste can be mixed with the glass batch materials, the composition of the batch being governed by the analysis of the waste, the mixture melted under controlled conditions to prevent contamination of the environment outside of the melting unit, the melt cooled to a glass and thereafter crystallized to a phase assemblage tailored to incorporate the radioactive species and provide a body demonstrating high thermal stability and excellent corrosion resistance to hostile environments. The controlled conditions referred to customarily involves melting in a closed system.

It will be appreciated that the composition of the radwaste is a significant factor in determining the quantity of waste that can be incorporated into the inventive materials without substantively altering the basic crystal assemblage. However, at least 10% by weight of the typical radwaste disclosed by Ringwood et al, supra, and it has been estimated that up to 20% by weight thereof can be incorporated into the inventive materials without causing a substantial change in the phase assemblage.

Second, the precursor glass forming batch, exclusive of radwaste, can be melted under conventional conditions and the glass resulting therefrom comminuted to a fine powder [commonly finer than a No. 200 United States Standard Sieve (74 microns)]. This powder is then combined with the radwaste and the mixture melted under controlled conditions to uniformly dissolve the radwaste in the melt. Thereafter, the melt is cooled to a glass body which is heat treated to develop the desired crystal assemblage therein. Inasmuch as melting of the powdered glass can be accomplished at temperatures below those demanded for melting the batch ingredients, this method embodiment permits the use of melting temperatures of about 1600°-1700° C. rather than at least about 1800° C.

This practice has the additional advantage of providing flexibility in the treatment of radwaste. For example, the precursor glass forming batch can be melted, powdered, and the powdered glass stored until needed to be mixed with the radwaste. Or, the powdered precursor glass powder can be produced at one site and then shipped to the source of the radwaste and the second melting plus crystallization steps conducted there.

Third, the precursor glass forming batch, exclusive of radwaste, can be melted and powdered in like manner to the practice described immediately above. Thereafter, the powder is thoroughly blended with the radwaste and the mixture essentially simultaneously crystallized and sintered under controlled conditions into a solid body. Standard ceramic forming techniques such as slip casting, dry pressing, extrusion, and hot pressing can be utilized to shape the body. Because glass compositions can be formulated to flow somewhat and sinter prior to crystallization, this practice allows sintering to be accomplished at temperatures as low as about 1400° C. Hence, this inventive embodiment provides the advantage of requiring lower firing temperatures but, as with any sintering process, a small amount of residual porosity may be present in the final product. Nevertheless, judicious formulation of the precursor glass composition can reduce this porosity to a minimum.

The very high refractoriness of the inventive compositions suggests their utility in applications other than radwaste disposal, where high service temperatures are encountered. One such application is as a matrix for inorganic fiber composites. For example, such high temperature fibers as alumina, silicon carbide, carbon, boron carbide, and boron nitride can be blended with powdered precursor glass and the mixture fired at about 1300°–1600° C. to simultaneously crystallize and sinter the glass powder into a solid body with the fibers entrained therewithin, the fibers acting as reinforcing elements for the resultant glass-ceramic.

PRIOR ART

U.S. Pat. No. 3,723,140 discloses the production of glass-ceramic articles wherein the predominant crystal phase is pollucite solid solution with, optionally, mullite. The disclosed glass-ceramics consist essentially, expressed in weight percent on the oxide basis, of $Cs_2O > 15\%$ but $< 40\%$,
$Al_2O_3 > 10\%$ but $< 55$, and
$SiO_2 > 25\%$ but $< 75\%$.

Whereas there is mention of the optional presence of $ZrO_2$ in amounts up to 10% and the growth of cubic zirconia crystals in the final product, there is no indication of the value in including even greater amounts of zirconia and there is not even a suggestion of the generation of monazite crystals which would make such materials especially useful for incorporating radioactive wastes.

DESCRIPTION OF THE PREFERRED EMBODIMENTS

Table I records compositions, expressed in parts by weight on the oxide basis, of thermally crystallizable glasses which, when subjected to the heat treatment practice outlined in this invention, were crystallized in situ to highly crystalline, glass-ceramic articles containing the desired crystal phases of pollucite, mullite, monazite, and zirconia. Because the sum of the components totals or approximately totals 100, for all practical purposes the individual values may be deemed to reflect weight percent. The actual batch constituents may be any materials, either the oxides or other compounds, which, when melted together, are converted to the desired oxides in the proper proportions.

The batch ingredients were compounded, ballmilled together to assist in securing a homogeneous melt, and the mixture deposited into rhodium crucibles. After covering, the crucibles were introduced into a furnace operating at about 1800°–2000° C. and the batches melted for about 1–6 hours. The melts were poured onto steel plates to form slabs and those slabs then transferred immediately to annealers operating at about 750°–1000° C.

TABLE I

|  | 1 | 2 | 3 | 4 | 5 | 6 | 7 | 8 |
|---|---|---|---|---|---|---|---|---|
| $SiO_2$ | 22.2 | 31.4 | 29.6 | 37.0 | 31.8 | 25.5 | 33.3 | 22.4 |
| $Al_2O_3$ | 22.2 | 31.4 | 29.6 | 37.0 | 31.8 | 25.5 | 33.3 | 22.4 |
| $Cs_2O$ | 15.5 | 22.0 | 20.8 | 8.0 | 22.3 | 19.0 | 23.9 | 16.1 |
| $La_2O_3$ | 15.6 | — | — | — | 9.8 | 12.0 | — | 7.3 |
| $P_2O_5$ | 9.2 | — | — | — | 4.3 | 6.0 | 4.3 | 9.0 |
| $ZrO_2$ | 15.4 | 15.3 | 20.0 | 12.0 | 22.3 | 8.0 | — | 12.0 |
| CaO | — | — | — | 6.0 | — | 4.0 | — | — |
| $CeO_2$ | — | — | — | — | — | — | 5.2 | 10.8 |

After annealing, the slabs were introduced into an electrically-fired furnace and exposed to the heat treatment schedules reported in Table II. In each of the schedules the temperature within the furnace was raised at a rate of about 300° C./hour to the specific dwell temperatures listed. At the conclusion of each heat treatment cycle, the electric current to the furnace was cut off and the crystallized articles merely left therewithin to cool to room temperature. That practice, familiarly designated "cooling at furnace rate", involves a cooling rate of about 3°–5° C./minute and was employed simply as a matter of convenience.

Table II also undertakes a visual description of the glass-ceramic, records the coefficient of thermal expansion over the range of 20°–300° C. ($\times 10^{-7}/°C.$), and reports the crystal phases present therein as identified via X-ray diffraction analyses. As observed through electron microscopy, the microstructure of the crystallized articles appears to be highly crystalline, viz., greater than 50% by volume. The preferred bodies are very highly crystalline. The individual crystals are very fine-grained, essentially all being less than five microns in diameter with the vast majority being less than one micron in diameter. Finally, Table II records the weight loss (mg/cm$^2$) sustained after exposure in an autoclave operating at 300° C., 1000 psi steam pressure, for 24 hours. This is an accelerated test simulating hydrothermal conditions experienced when a body containing radwastes is buried underground.

TABLE II

| Example No. | Heat Treatment | Visual Description | Coeff. Exp. | Crystal Phases | Autoclave |
|---|---|---|---|---|---|
| 1 | 1000° C. for 1 hour<br>1500° C. for 1 hour | White, opaque, very fine-grained | — | Pollucite, monazite, mullite, tetragonal $ZrO_2$ | 0.427 |
| 2 | 1000° C. for 1 hour<br>1400° C. for 1 hour | Yellow surface, white fracture, very fine-grained | 63.9 | Pollucite, tetragonal $ZrO_2$, corurdum | 0.159 |
| 3 | 1000° C. for 4 hours<br>1400° C. for 4 hours | White, opaque, very fine-grained | 46.5 | Pollucite, tetragonal $ZrO_2$, corundum | — |
| 4 | 1000° C. for 4 hours<br>1500° C. for 4 hours | Yellow surface, white fracture, very fine-grained | — | Cubic $ZrO_2$, mullite | 0.0369 |
| 5 | 1000° C. for 4 hours<br>1500° C. for 1 hour | White, opaque, very fine-grained | — | Pollucite, monazite mullite | 0.866 |
| 6 | 1000° C. for 1 hour<br>1500° C. for 1 hour | Yellow, opaque, very fine-grained | 54.3 | Pollucite, monazite cubic $ZrO_2$ | 0.240 |
| 7 | 900° C. for 4 hours<br>1300° C. for 4 hours | Yellow, opaque, very fine-grained | 49.1 | Pollucite, monazite, mullite | 0.363 |
| 8 | 900° C. for 4 hours<br>1300° C. for 4 hours | Green, opaque, very fine-grained | 59.4 | Pollucite, mullite, monazite, tetragonal | 0.795 |

TABLE II-continued

| Example No. | Heat Treatment | Visual Description | Coeff. Exp. | Crystal Phases | Autoclave |
|---|---|---|---|---|---|
| | | | | $ZrO_2$ | |

Under U.S. Department of Energy Contract EY-76-C-06-1830, Pacific Northwest Laboratory reported (PNL-2904/UC-70, August, 1979) formulating a glass composition simulating average Hanford, Washington defense wastes that had been modified by the radionuclide removal process, which process removes most of the soluble salts. The composition of that glass, in parts by weight, is tabulated below as is that of borosilicate laboratory glass Code 7740, marketed by Corning Glass Works, Corning, N.Y. under the trademark PYREX ®.

| | PNL Glass | Code 7740 |
|---|---|---|
| $SiO_2$ | 46.7 | 80.5 |
| $B_2O_3$ | 13.63 | 12.9 |
| $Li_2O$ | 3.05 | — |
| $TiO_2$ | 3.26 | — |
| $CeO_2$ | 1.00 | — |
| $P_2O_5$ | 1.72 | — |
| $Bi_2O_3$ | 0.91 | — |
| MnO | 0.71 | — |
| $Al_2O_3$ | 7.02 | 2.2 |
| $Fe_2O_3$ | 4.27 | — |
| NiO | 0.62 | — |
| $Cr_2O_3$ | 0.41 | — |
| SrO | 1.89 | — |
| CaO | 0.64 | — |
| $Na_2O$ | 13.43 | 3.8 |
| $ZrO_2$ | 1.03 | — |
| $K_2O$ | — | 0.4 |

Those glasses were subjected to the above-described test for resistance to hydrothermal conditions with the following results. The PNL glass sustained a weight loss of 27.84 mg/cm² and exhibited visible gross deterioration. Code 7740 glass sustained a weight loss of 5.49 mg/cm². A comparison of those values with the measurements recorded in Table II illustrates that the inventive glass-ceramics can demonstrate resistance to hydrothermal conditions orders of magnitude superior to those glasses.

We claim:

1. A glass-ceramic especially suitable for incorporating radioactive wastes wherein the crystal phases thereof consist essentially of monazite and pollucite and at least one of the group mullite, and $ZrO_2$, said glass-ceramic consisting essentially, expressed in weight percent on the oxide basis, of 5-40% $Cs_2O$, 15-50% $Al_2O_3$, 5-30% $La_2O_3+CeO_2$, up to 20% $P_2O_5$, 0-30% $ZrO_2$, 12-65% $La_2O_3+CeO_2+P_2O_5+ZrO_2$, and 15-50% $SiO_2$.

2. A method for making a glass-ceramic especially suitable for incorporating radioactive wastes wherein the crystal phases thereof consist essentially of monazite and pollucite and at least one of the group mullite, and $ZrO_2$ which comprises the steps of:
   (a) melting a batch for a glass consisting essentially, expressed in weight percent on the oxide basis, of 5-40% $Cs_2O$, 15-50% $Al_2O_3$, 5-30% $La_2O_3+CeO_2$, up to 20% $P_2O_5$, 0-30% $ZrO_2$, 12-65% $La_2O_3+CeO_2+P_2O_5+ZrO_2$, and 15-50% $SiO_2$;
   (b) simultaneously cooling said melt at least below the transformation range thereof and shaping a glass body of a desired configuration therefrom; and thereafter
   (c) exposing said glass body to a temperature between about 1250°-1550° C. for a period of time sufficient to cause the growth in situ of the desired crystals.

3. A method according to claim 2 wherein prior to exposing said glass article to a temperature between about 1250°-1550° C. it is exposed to a temperature between about 900°-1100° C. for a period of time sufficient to cause nucleation to occur therein.

* * * * *

UNITED STATES PATENT AND TRADEMARK OFFICE
CERTIFICATE OF CORRECTION

PATENT NO. : 4,314,909
DATED : February 9, 1982
INVENTOR(S) : George H. Beall et al It is certified that error appears in the above—identified patent and that said Letters Patent is hereby corrected as shown below:

Column 3, line 23, "($>$5%)" should read -- ($<$5%) --.

Table II, line 7, "corurdum" should read 00 corundum --.

Signed and Sealed this

Sixth Day of July 1982

[SEAL]

Attest:

Attesting Officer

GERALD J. MOSSINGHOFF

Commissioner of Patents and Trademarks